Oct. 4, 1932.  F. KURATH  1,881,232

MOLD

Filed April 22, 1929

Inventor:
Franz Kurath,
By Wilkinson Huxley Byron & Knight
Attys

Patented Oct. 4, 1932

1,881,232

UNITED STATES PATENT OFFICE

FRANZ KURATH, OF CHICAGO, ILLINOIS, ASSIGNOR TO ECONOMY FUSE AND MANUFACTURING CO., OF CHICAGO, ILLINOIS, A CORPORATION OF NEW YORK

MOLD

Application filed April 22, 1929. Serial No. 356,936.

This invention relates to improvements in apparatus for performing molding operations and particularly to apparatus for molding material such as phenolic condensation products that will flow to take the shape of the mold upon the application of molding pressure in a press.

Molds as commonly constructed comprise either the flash type mold in which there are a pair of cooperating mold blocks which are pressed together to form the article, or the positive type of mold which consists of a body, usually having an ejector in its base to remove the formed article, and a cooperating plunger which applies the molding pressure. Certain shapes of articles cannot be efficiently molded by either of the usual types of molds. Thus articles which are deep and hollow with threads or bosses, etc. on their exteriors, require split mold parts held in a chase or retaining ring and the application of pressure by a plunger. The operation of molding with molds of this form is rendered slow and expensive because of the labor required in assembling the mold prior to the application of the molding pressure by the plunger. Therefore, it has been previously proposed to use what is called an "angle press" in which the split molded parts are first closed by means of a horizontal ram and the plunger is then actuated by a vertical ram and applies the molding pressure. Angle presses are relatively expensive equipment and therefore it is desired to construct the molding equipment so that articles of the type mentioned may be molded in the usual plunger type press having a single ram.

It is the purpose of my invention to provide molding equipment in which a pair of cooperating mold blocks are pressed to closed position by the pressure applied by the plunger which forms the interior of the molded article.

It is an object of the invention to carry out the above purpose by mounting the pair of cooperating mold blocks by means of toggle links extending from a fixed frame whereby the upward movement of the ejector will separate the mold blocks and allow the formed article to be removed, while, upon downward movement of the ejector, the cooperating mold blocks will gravitally swing to closed position and upon the downward movement of the plunger, the mold blocks will be forced into tightly closed relation during the molding operation.

It is also an object of my invention to carry out the principles above mentioned whereby either single articles or a plurality of articles may be molded in one operation in the ordinary plunger type press.

Further objects and advantages of my improvements will be more readily apparent from the following description taken in connection with the attached drawing in which—

Figure 1:
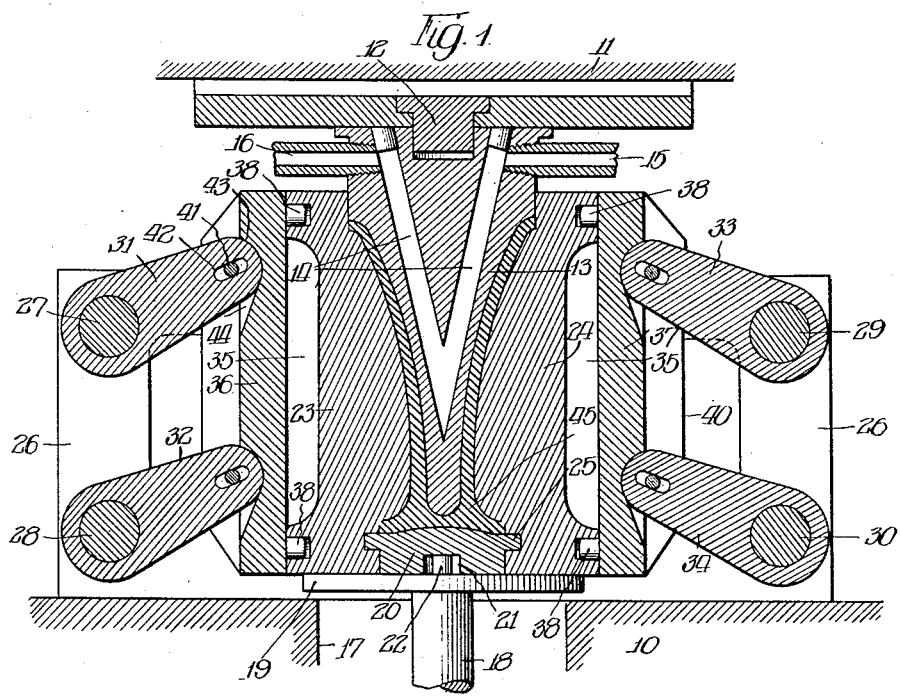
Figure 1 is a vertical sectional elevation through the molding equipment and illustrates the formation of a vase.

The disclosure in the drawing is somewhat diagrammatic, but it will be sufficient to enable anyone skilled in the art to construct molding equipment embodying my improvements.

I show in Figure 1 a fixed bed 10 and an upper movable pressing head 11 which carries a block 12 to which is secured a plunger 13. In the illustration shown, the article which is being formed is a vase, but it is apparent that the shape of the plunger may be modified in accordance with the particular article which it is desired to mold. The plunger 13 is provided with suitable cored openings 14 through which heating or cooling fluid may be passed through the inlet and outlet pipes 15 and 16. An opening 17 in the fixed bed receives a plunger 18 to the top of which is secured an ejector disk 19. A bottom mold part 20 may be fixedly secured to the disk 19 or, as shown, may include a central recess 21 which receives a centering pin 22 upon the disk 19. Thus the bottom part may freely rest upon the disk 19 and will be allowed to have limited movement in order to closely cooperate with the molding blocks 23—24. The molding blocks 23—24 are formed with suitable impressions upon their inner surfaces to cooperate with the plunger 13 and the bottom 20 to form the molded article.

In Figure 1, the molding blocks are in closed position and it should be noted that the bottom 20 is provided with a laterally extending stepped edge 25 which is received in suitable recesses formed in the cooperating mold blocks 23—24.

Instead of closing the mold blocks by means of a horizontal ram, as is necessary in an angle press, I have provided means which will support the blocks in such a manner that they will normally swing together due to the force of gravity and the pressure of the plunger 13 will force the mold blocks into tightly closed relation during the molding operation. I, therefore, provide a surrounding frame 26 which is adapted to seat upon the fixed bed 10 and is provided with horizontally extending pivot shafts 27, 28, 29, and 30. Thus the pivot shafts 27 and 28 are mounted in one side of the frame 26 and are parallelly arranged but vertically spaced. Toggle links 31, 32, 33 and 34 are supported by the pivot shafts. The mold blocks 23—24 are provided with the recesses 35—35 which are closed by the thrust plates 36 and 37 to form circulating spaces for the passage of heating or cooling fluid. The plates 36 and 37 are attached by bolts (not shown) and are formed with pins 38 which are received in corresponding recesses of the mold blocks 23—24. To the forward and rearward sides of the mold blocks, together with the attached plates, are secured supporting plates 40 which include pins 41 which are adapted to be received in elongated openings 42 of the toggle links 31, 32 and 33. The inner end of each of the toggle links is curved about the axis of the pins 41 as a center, as indicated at 43. The side thrust plates 36 and 37, which are attached to the mold blocks, are formed with cut-out portions 44 which receive the curved ends of the toggle links.

From the position shown in Figure 1, it is apparent that the toggle links are maintained in positions upwardly inclined towards the plunger 13 so that the pressure upon the plunger 13 will produce a corresponding reacting thrust in the toggle members which will produce horizontal components tending to press the mold blocks 23—24 to tightly closed positions. The pressure, which is received by the toggle links, is transmitted through the cooperating bearing surfaces of the curved ends of the toggle links and the cut-out portions 44 of the mold blocks. By the provision of elongated openings 42, it is apparent that none of the heavy pressure will fall upon the relatively small supporting pins 41.

The operation will be readily apparent. The molding composition indicated at 45 is placed in the opening between the mold blocks 23—24 and the bottom 20 and the plunger 13 is then moved downward. The application of the molding pressure will cause the plunger to form the interior of the article while the outer surface of the article will be pressed to shape by the mold blocks 23—24 which will be held in tightly closed position by the components of horizontal pressure transmitted by the toggle links.

Upon completion of the molding operation, the plunger 13 is retracted and the mold blocks 23—24 are separated by upward movement of the ejector plunger 18 which causes swinging movements of the mold blocks about their supporting pivots. The molded article may then be readily removed from the bottom 20. During the retractive movement of the plunger 13, the mold blocks may, if so desired, be prevented from upward movement by the provision of suitable means thus causing the plunger to separate from the formed article. It should be noted that by providing a pair of toggle links for each mold block they will be maintained in vertical positions during the swinging movements.

Figure 2:
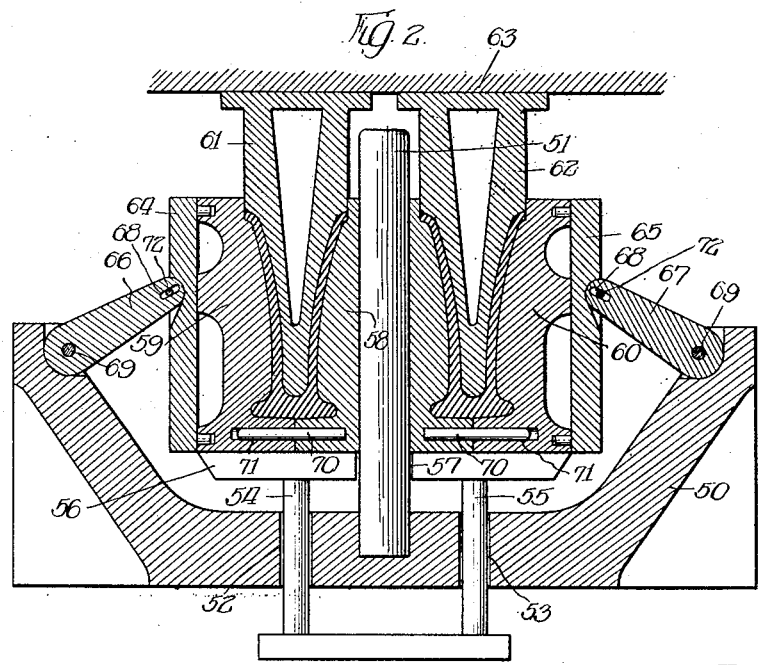
Figure 2 is a similar sectional elevation through molding equipment embodying my improvements and comprising a modification of the structure shown in Figure 1.

If desired, the structure disclosed in Figure 1 could be embodied in apparatus for molding a plurality of articles at the same time by forming each of the mold blocks with a plurality of impressions and utilizing a corresponding number of plungers. But if it is desired to mold more articles at one time than can be arranged in a single line in accordance with the width of the press, a modified form, such as shown in Figure 2, may be utilized. In this form is shown a frame 50 having inclined sides. At the center of the frame 50 is secured an upstanding post 51. The frame 50 is also provided with a pair of openings 52—53 through which extend the ejector rods 54—55 which support at their upper ends, an ejector plate 56 having a guiding opening 57 which receives the post 51. Also guided by the center post 50 and preferably non-rotatably slidable thereon is a block 58 which has mold impressions on its opposite faces cooperating with mold impressions formed in the mold blocks 59 and 60. Thus, as shown in Figure 2, the mold block 59 will cooperate with the central block 58 to form one article while the mold block 60 will cooperate with the other side of the central block 58 to form another article. Therefore, I provide a pair of plungers 61—62 which are operated by the upper pressing head 63. As before, the outer sides of the mold blocks 59—60 are formed with cores covered by the plates 64—65. A single toggle link 66 is utilized to transmit the thrust upon the mold block 59 while the other mold block 60 is provided with a toggle link 67. The toggle links 66 and 67 are pivoted on the pins 69 mounted in the frame 50 while the upper ends of the links are formed with slots 68 to receive the pins 72. The pressure developed by the movement of the plunger 62 will be communicated through the toggle links 66—67 and produce horizontal components which will tend to press the outer mold blocks into closing relation with the intermediate mold block 58. The pressure upon the toggle links will be transmitted by the rounded ends and will not fall upon the pins 69 or 72 which merely serve to prevent displacement of the parts upon the separating movement thereof.

In order to provide for a perfectly parallel movement of the outer mold blocks relative to the intermediate block 58 which slides on the post, I may utilize a cooperating pin and guide opening, such as shown in Figure 2, in which guiding pins 70 are secured to the central block 58 and received by the openings 71 formed in the outer blocks 59—60. It should also be apparent that the ejector disk 56 will tend to maintain the mold blocks in correct parallel arrangement.

The molding operation takes place substantially as before in that the molding composition is placed in the die openings formed by the cooperating mold blocks and, upon downward movement of the plungers 61—62, the molding pressure is applied to cause the molding composition to flow and form the articles. After completion of the molding operation, the plungers are retracted and by upward movement of the ejector rods, the molds are opened. Thus by a construction such as shown in Figure 2 it is possible to provide parallel lines of die openings by extending the width of the mold blocks to allow a plurality of impressions.

Various modifications and changes may be made in the particular embodiment of the molding equipment by those skilled in the art without departing from the spirit of my invention as expressed in the appended claims.

I claim:

1. Apparatus for forming molding operations comprising a plurality of relatively separable cooperating mold blocks, a fixed frame, cooperating members between said fixed frame and said mold blocks permitting gravital downward movement of said mold blocks into closed relation, said cooperating members causing transverse separation of said mold blocks during the upward movement thereof, means for applying molding pressure in a downward direction to said mold blocks, said molding pressure being transmitted through said cooperating members and producing transverse components of pressure tending to force said mold blocks into tightly closed relation in order to form a molded article, means to move said mold blocks in an upward direction whereby said cooperating members cause relative transverse separation of said mold blocks in order to permit removal of a molded article, said cooperating members comprising toggle links extending between said fixed frame and said mold blocks.

2. Apparatus for performing molding operations comprising relatively separable mold blocks, a fixed frame, toggle links extending between said fixed frame and said mold blocks, supporting pins carried by said mold blocks, said toggle links having elongated openings adapted to receive said supporting pins, said toggle links having rounded ends adapted to bear against corresponding socketed portions of said mold blocks, means for applying molding pressure in a downward direction to said mold blocks, said molding pressure being transmitted through the rounded bearings ends of said toggle links and producing transverse components of pressure tending to force said mold blocks into tightly closed relation in order to form the molded article, and means for moving said mold blocks in upward directions whereby the connection between said supporting pins and said toggle links will cause said mold blocks to transversely separate in order to permit removal of a molded article.

3. Apparatus for performing molding operations comprising a plurality of relatively separable mold blocks, a fixed frame, pivoted members supporting said mold blocks on said frame and permitting gravital movement of said mold blocks into closed relation, means for guiding the movement of said mold blocks in parallel relation, means for applying pressure in a downward direction to said mold blocks to force said mold blocks into tightly closed relation, and means to move said mold blocks in an upward direction to produce separation thereof and permit removal of a molded article.

4. Apparatus for performing molding operations comprising a plurality of vertical relatively separable mold blocks, a fixed frame, means extending between said fixed frame and said mold blocks adapted to maintain said mold blocks in substantially parallel relation during movement thereof, means for applying pressure in a downward direction upon said mold blocks to force said mold blocks into tightly closed relation, vertically movable means for opening said mold blocks and a bottom mold block carried by said last-named means free to have relative movement with respect thereto to center itself with respect to said first-mentioned mold blocks.

Signed at Chicago, Illinois, this 16th day of April, 1929.

FRANZ KURATH.